United States Patent
Song et al.

(10) Patent No.: US 11,917,295 B2
(45) Date of Patent: Feb. 27, 2024

(54) METHOD FOR CORRECTING SHAKING AT HIGH MAGNIFICATION AND ELECTRONIC DEVICE THEREFOR

(71) Applicant: Samsung Electronics Co., Ltd., Suwon-si (KR)

(72) Inventors: Wonseok Song, Suwon-si (KR); Sehyun Lee, Suwon-si (KR); Hongseob Shin, Suwon-si (KR); Bohee Lee, Suwon-si (KR); Yookyung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/950,963

(22) Filed: Sep. 22, 2022

(65) Prior Publication Data

US 2023/0012826 A1    Jan. 19, 2023

Related U.S. Application Data

(63) Continuation of application No. PCT/KR2021/003353, filed on Mar. 18, 2021.

(30) Foreign Application Priority Data

Mar. 23, 2020   (KR) ........................ 10-2020-0035110

(51) Int. Cl.
*H04N 23/68*  (2023.01)
*H04N 23/63*  (2023.01)
*H04N 23/69*  (2023.01)

(52) U.S. Cl.
CPC ......... *H04N 23/683* (2023.01); *H04N 23/632* (2023.01); *H04N 23/69* (2023.01)

(58) Field of Classification Search
CPC .. H04N 23/683; H04N 23/6811; H04N 23/68; H04N 23/6842; H04N 23/632; H04N 23/69; H04N 23/633
See application file for complete search history.

(56) References Cited

U.S. PATENT DOCUMENTS 11,165,960 B2   11/2021   Lee et al.
2006/0262193 A1   11/2006   Kumaki
(Continued)

FOREIGN PATENT DOCUMENTS

JP   2001-94858   4/2001
JP   2007-267233   10/2007
(Continued)

OTHER PUBLICATIONS

International Search Report for PCT/KR2021/003353 dated Jun. 25, 2021, 5 pages.
(Continued)

*Primary Examiner* — Chiawei Chen
(74) *Attorney, Agent, or Firm* — Nixon & Vanderhye, P.C.

(57) ABSTRACT

An example electronic device includes a camera module, a display, and a processor. The processor is configured to: obtain a magnification input corresponding to a first magnification; acquire first image data corresponding to a second magnification, which is different from the first magnification, from among image data obtained by an image sensor of a first camera module, based on the obtaining of the magnification input; determine second image data corresponding to at least a part of the acquired first image data; perform shaking correction on the generated second image data; and display a preview image having the first magnification on the display, based on the second image data.

18 Claims, 10 Drawing Sheets

(56) References Cited

U.S. PATENT DOCUMENTS

| | | | | |
|---|---|---|---|---|
| 2009/0167896 A1* | 7/2009 | Nakayama | ............ | H04N 5/2628 |
| | | | | 348/240.1 |
| 2010/0061657 A1* | 3/2010 | Chien | .................. | H04N 23/611 |
| | | | | 382/276 |
| 2011/0019936 A1 | 1/2011 | Bhrugumalla | | |
| 2013/0165753 A1 | 6/2013 | Takahashi | | |
| 2013/0170770 A1 | 7/2013 | Chon | | |
| 2014/0267807 A1* | 9/2014 | Miyahara | ............. | H04N 23/667 |
| | | | | 348/208.4 |
| 2015/0077594 A1 | 3/2015 | Nakahara | | |
| 2017/0034410 A1* | 2/2017 | Yoo | ...................... | H04N 23/632 |
| 2018/0070015 A1 | 3/2018 | Hubel et al. | | |
| 2021/0195113 A1* | 6/2021 | Tsubusaki | ............ | H04N 23/682 |
| 2021/0400197 A1* | 12/2021 | Sato | ...................... | H04N 23/633 |
| 2022/0394190 A1* | 12/2022 | Cui | ......................... | H04N 23/62 |
| 2022/0417437 A1* | 12/2022 | Kimura | ................ | H04N 23/663 |

FOREIGN PATENT DOCUMENTS

| | | |
|---|---|---|
| JP | 2012-55498 | 3/2012 |
| JP | 6332996 | 5/2018 |
| KR | 10-2010-0106800 | 10/2010 |
| KR | 10-1231494 | 2/2013 |
| KR | 10-2016-0087682 | 7/2016 |
| KR | 10-2017-0013102 | 2/2017 |
| KR | 10-2021-0101078 | 8/2021 |
| KR | 10-2021-0118622 | 10/2021 |

OTHER PUBLICATIONS

Written Opinion of the ISA for PCT/KR2021/003353 dated Jun. 25, 2021, 4 pages.

\* cited by examiner

METHOD FOR CORRECTING SHAKING AT HIGH MAGNIFICATION AND ELECTRONIC DEVICE THEREFOR

CROSS-REFERENCE TO RELATED APPLICATIONS

This application is a continuation of International Application No. PCT/KR2021/003353, filed on Mar. 18, 2021, at the Korean Intellectual Property Receiving Office and claiming priority to Korean Patent Application No. 10-2020-0035110, filed on Mar. 23, 2020 at the Korean Intellectual Property Office, the disclosures of each which are incorporated by reference herein in their entireties.

BACKGROUND

Field

The disclosure relates to image stabilization of an electronic device at camera shooting.

Description of Related Art

In camera functions, image stabilization is an essential and important function for obtaining clear pictures. In general, an image stabilization scheme includes optical image stabilization (OIS) and digital image stabilization (DIS). The optical image stabilization scheme reduces shake by moving a lens or sensor. The electronic image stabilization scheme reduces shake by digital processing.

As the performance of a camera in a portable terminal such as a smart phone has improved dramatically, a high quality of a shooting result is required. An anti-shake function supported by the camera in order to achieve this high quality can be said to be an important factor. In particular, recently, as the zoom performance of portable terminals is improved, it is required to improve the anti-shake function at high-magnification shooting.

Generally, the digital image stabilization scheme applied to a portable terminal performs image stabilization based on image data inputted through an image sensor and data obtained through a gyro sensor. The range of image stabilization is calculated based on a size ratio of an image inputted to an image stabilization unit regardless of low magnification or high magnification. The image stabilization is performed based on the calculated stabilization range.

For example, conventional image stabilization is applied to a so-called stabilization range in which a predetermined margin is reflected in a size of a preview image outputted to a display. When a zoom input of magnifying/reducing the preview image is generated by a user, image data acquired by an image sensor of a camera is magnified at a magnification indicated by the zoom input, and image stabilization is applied to an area corresponding to the stabilization range among magnified areas.

SUMMARY

As a zoom magnification supported by an electronic device increases, a user can magnify a preview screen at a very high magnification. However, such a zoom input of high magnification causes only a very small portion of image data acquired by an image sensor to be outputted as preview data. In particular, since the high-magnification zoom input also reduces an amount of information corresponding to an input of a module performing image stabilization in the electronic device, the effect of stabilization is reduced.

Also, as the zoom magnification is increased, a motion of an image outputted as a preview is greatly increased according to the movement of a mobile phone, and when digital image stabilization is performed at high-magnification shooting, anti-shake stabilization calculates an image stabilization range at a size ratio of an input image, so image stabilization performance is eventually deteriorated.

An electronic device of an embodiment of the present disclosure may include at least one camera module having an image sensor, a display, and at least one processor connected to the at least one camera module and the display. The processor may be configured to acquire a magnification input corresponding to a first magnification, based on acquiring the magnification input, acquire first image data corresponding to a second magnification different from the first magnification from among image data acquired by the image sensor of the first camera module, determine second image data corresponding to at least a part of the acquired first image data, perform image stabilization on the provided second image data, change a scale of the second image data on which the image stabilization has been performed, based on the first magnification and the second magnification, and display a preview image having the first magnification on the display, based on the second image data whose scale has been changed.

A method of an embodiment of the present disclosure may include acquiring, by at least one processor connected to at least one camera module and a display, a magnification input corresponding to a first magnification, based on acquiring the magnification input, acquiring first image data corresponding to a second magnification different from the first magnification from among image data acquired by an image sensor of at least one camera module, providing second image data corresponding to at least a part of the acquired first image data, performing image stabilization on the provided second image data, changing a scale of the second image data on which the image stabilization has been performed, based on the first magnification and the second magnification, and displaying a preview image having the first magnification on a display, based on the second image data whose scale has been changed.

A storage medium of an embodiment of the present disclosure stores computer-readable instructions, and, when the instructions are executed by at least one processor of an electronic device, the instructions enable at least one processor to control the electronic device to acquire a magnification input corresponding to a first magnification, and, based on acquiring the magnification input, acquire first image data corresponding to a second magnification different from the first magnification from among image data acquired by an image sensor of at least one camera module included in the electronic device, determine second image data corresponding to at least a part of the acquired first image data, perform image stabilization on the provided second image data, change a scale of the second image data on which the image stabilization has been performed, based on the first magnification and the second magnification, and display a preview image having the first magnification on a display of the electronic device, based on the second image data whose scale has been changed.

According to various embodiments, an image stabilization range may be enlarged at a high magnification.

According to various embodiments, an image that is not shaken, even in a high-magnification environment, may be presented to a user.

In addition, various effects recognized directly or indirectly through the present disclosure may be presented.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various embodiments of the present disclosure are disclosed with reference to the accompanying drawings. However, the present disclosure is not intended to be limited by the various embodiments of the present disclosure to any specific embodiments and it is intended that the present disclosure covers all modifications, equivalents, and/or alternatives of the present disclosure provided they come within the scope of the appended claims and their equivalents.

Figure 1:
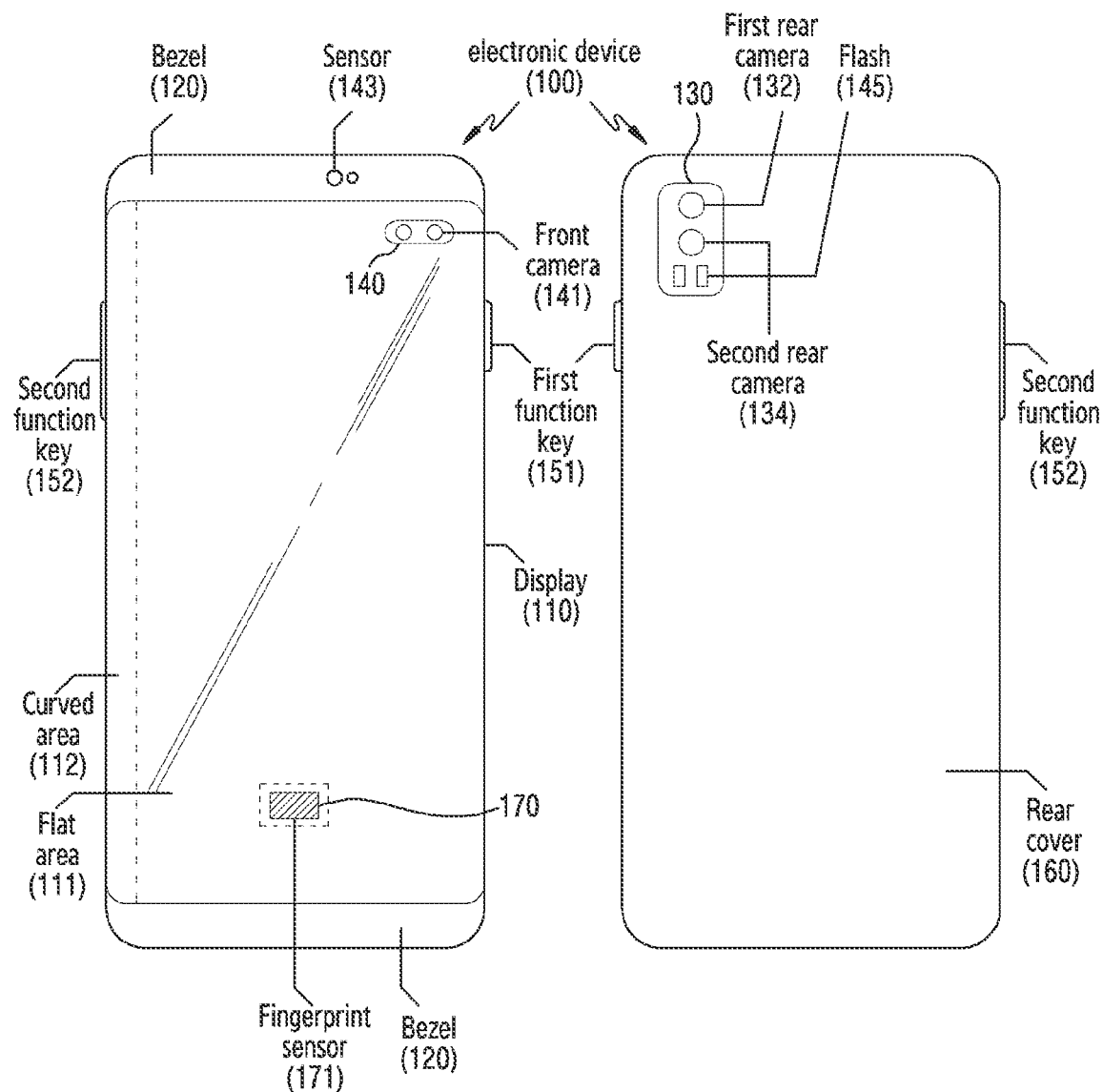
FIG. 1 illustrates an example electronic device according to various embodiments.

FIG. 1 illustrates an example electronic device according to various embodiments.

Referring to FIG. 1, a display 110 may be arranged on a front surface of the electronic device 100 of an embodiment. In an embodiment, the display 110 may occupy most of the front surface of the electronic device 100. The display 110 and a bezel 120 region surrounding at least some edges of the display 110 may be arranged on the front surface of the electronic device 100. In an example of FIG. 1, the display 110 may include a flat area 111, and a curved area 112 extending from the flat area 111 toward a side surface of the electronic device 100. Although the curved area 112 is displayed only at one side (e.g., a left side) in FIG. 1, it may be understood that a curved area is also formed identically at an opposite side. Also, the electronic device 100 illustrated in FIG. 1 is one example, and various embodiments are possible. For example, the display 110 of the electronic device 100 may include only the flat area 111 without the curved area 112, or may include the curved area 112 only at one edge, not edges on both sides. Also, in an embodiment, the curved area may extend to a rear surface of the electronic device 100, so the electronic device 100 may include an additional flat area as well.

In an embodiment, a fingerprint sensor 171 for recognizing a user's fingerprint may be included in a first area 170 of the display 110. Since the fingerprint sensor 171 is arranged on a layer below the display 110, the fingerprint sensor 171 may not be recognized by a user or may be difficult to be recognized. Also, in addition to the fingerprint sensor 171, a sensor for additional user/biometric authentication may be arranged in a partial region of the display 110. In an embodiment, a sensor 143 for user/biometric authentication may be arranged in one area of a bezel 120. For example, an IR sensor for iris authentication may be exposed through one area of the display 110, or may be exposed through one area of the bezel 120.

In an embodiment, a front camera 141 of a camera module 140 may be arranged on the front surface of the electronic device 100. In the embodiment of FIG. 1, the front camera 141 is shown to be exposed through one area of the display 110, but in various embodiments, the front camera 141 may be exposed through the bezel 120.

In an embodiment, the electronic device 100 may include one or more front cameras 141. For example, the electronic device 100 may include two front cameras, such as a first front camera and a second front camera. In an embodiment, the first front camera and the second front camera may be cameras of the same type having the same specifications (e.g., pixels), but the first front camera and the second front camera may be implemented as cameras having different specifications. The electronic device 100 may support a function (e.g., 3D imaging, auto focus, etc.) related to a dual camera arrangement through the two front cameras.

In an embodiment, a rear camera may be arranged on a rear surface of the electronic device 100. The rear camera may be exposed through a partial area of a rear cover 160. In an embodiment, the electronic device 100 may include a plurality of rear cameras arranged in the partial area. For example, the electronic device 100 may include two or more rear cameras. For example, the electronic device 100 may include a first rear camera 132, a second rear camera 134, and a third rear camera (not shown in FIG. 1). The first rear camera, the second rear camera, and the third rear camera may have different specifications. For example, whether the first rear camera, the second rear camera and/or the third rear camera support FOV, pixels, aperture, and optical zoom/digital zoom, whether an image stabilization function is supported, and the type and array, etc. of a lens set included in each camera may be different from each other. For example, the first rear camera may be a general camera, the second rear camera may be a camera for wide shooting, and the third rear camera may be a telephoto camera. In the present disclosure, descriptions of functions or characteristics of the front camera may be applied to the rear camera, and vice versa.

In an embodiment, various hardware or sensors that assist photographing, such as a flash 145, may be additionally arranged in the camera module 130. For example, a distance sensor (e.g., a TOF sensor), etc. for detecting a distance between a subject and the electronic device 100 may be further included.

In an embodiment, at least one physical key may be arranged on a lateral portion of the electronic device 100. For example, a first function key 151 for turning on/off the display or turning on/off the power of the electronic device 100 may be arranged at a right edge with respect to the front surface of the electronic device 100. In an embodiment, a second function key 152 for controlling a volume or screen brightness of the electronic device 100 may be arranged at a left edge with respect to the front surface of the electronic device 100. In addition to this, additional buttons or keys may be arranged, even on the front surface or rear surface of the electronic device 100. For example, a physical button or touch button mapped to a specific function may be arranged in a lower region of the bezel 120 of the front surface.

The electronic device 100 illustrated in FIG. 1 corresponds to one example, and does not limit a device shape to which the present disclosure may be applied. For example, the present disclosure may be applied to a foldable electronic device, a tablet, or a notebook computer that is foldable in a horizontal direction or is foldable in a vertical direction by employing the flexible display 110 and a hinge structure. Also, the present disclosure may be applied when a first camera module and a second camera module facing in the same direction are arranged to face in different directions through device rotation, folding, deformation, etc.

Figure 2:
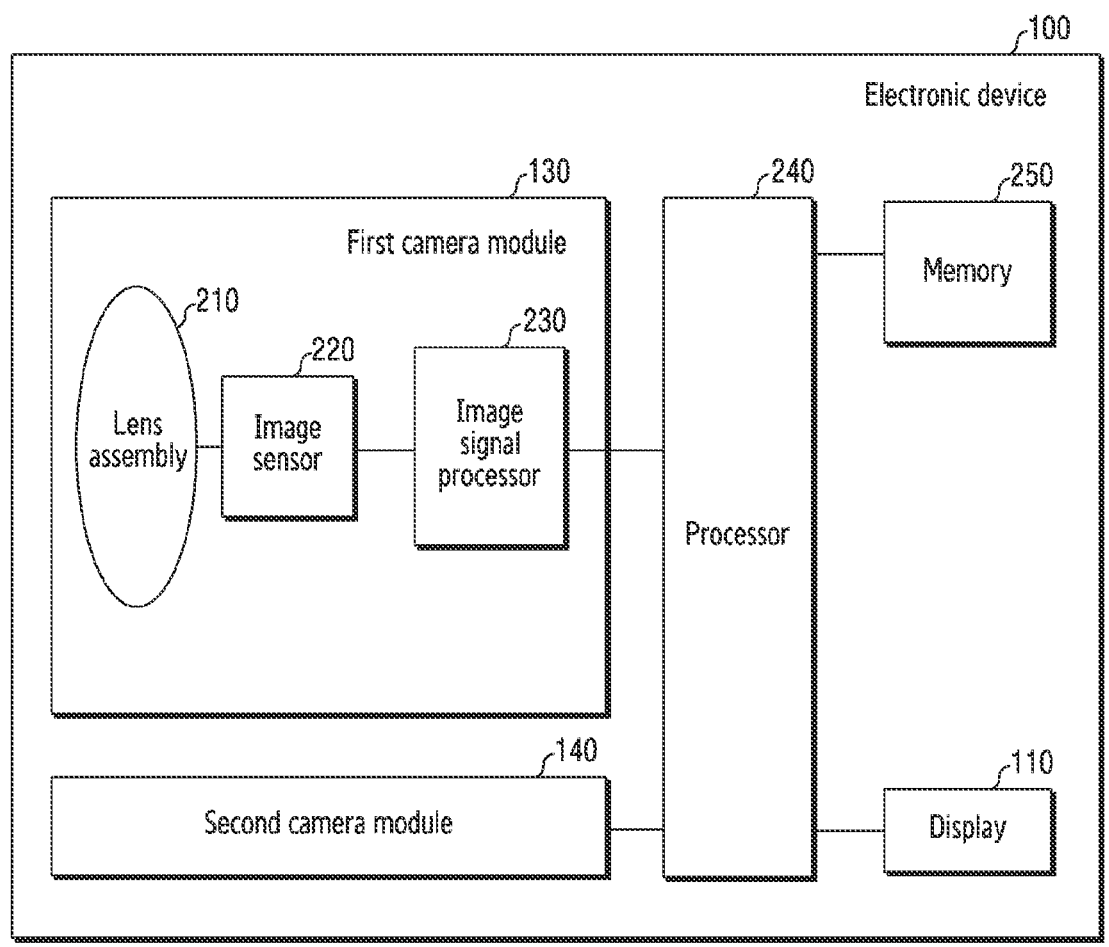
FIG. 2 illustrates a hardware construction of an example electronic device according to various embodiments.

FIG. 2 illustrates a hardware construction of an example electronic device according to various embodiments.

Referring to FIG. 2, in an embodiment, the electronic device 100 may include a first camera module 130, a second camera module 140, a processor 240, a display 110, and a memory 250. In a description of FIG. 2, a description of components already discussed with reference to FIG. 1 will not be repeated here.

In an embodiment, the first camera module 130 may include a lens assembly 210, an image sensor 220, and an image signal processor 230. A description of the first camera module 130 may be applied to the second camera module 140 in a similar manner. For example, the second camera module 140 may also include a lens assembly, an image sensor, and an image signal processor. In an embodiment, the lens assembly of the second camera module 140 may be different, in number, arrangement, type, etc., from the lens assembly of the first camera module 130. Depending on the type of the lens assembly, the first camera module 130 and the second camera module 140 may have different characteristics (e.g., a focal length, a maximum magnification, etc.).

The components illustrated in FIG. 2 are examples, and the electronic device 100 may further include additional components. For example, the electronic device 100 may further include at least one microphone for receiving audio data. Also, for example, the electronic device 100 may include at least one sensor for determining a direction in which a front surface or rear surface of the electronic device 100 faces, and/or posture (orientation) information of the electronic device 100. In an embodiment, the at least one sensor may include an acceleration sensor, a gyro sensor, and the like. Hardware which is included, or may be included, in the electronic device 100 of FIG. 2 is described in detail with reference to FIG. 9.

In an embodiment, the display 110 may display contents such as an execution screen of an application executed by the processor 240 or an image/video stored in the memory 250. Also, image data acquired through the first camera module 130 and/or the second camera module 140 may be displayed in real time on the display 110.

In an embodiment, the display 110 may be implemented integrally with a touch panel. The display 110 may support a touch function, and may detect a user input such as a touch using a finger, and forward information regarding the user input to the processor 240. The display 110 may be connected to a display driver integrated circuit (DDIC) for driving the display 110, and the touch panel may be connected to a touch IC for detecting touch coordinates and processing a touch-related algorithm. In an embodiment, the display driver integrated circuit and the touch IC may be integrally formed, but in various embodiments, the display driver integrated circuit and the touch IC may be formed separately. The display driver integrated circuit and/or the touch IC may be electrically connected to the processor 240.

In an embodiment, the display 110 may include a plurality of pixels. For example, the display may have at least one resolution such as high definition (HD), full high definition (FHD), ultra-high definition (UHD), etc. HD may refer, for example, to a resolution of 1280×720, FHD may refer, for example, to a resolution of 1920×1080, and UHD may refer, for example, to a resolution of 3840×2160. In addition to the above examples, the display 110 may present various types of resolutions.

In an embodiment, the processor 240 (e.g., including processing circuitry) may execute/control various functions supported by the electronic device 100. For example, the processor 240 may execute a code written in a programming language stored in the memory 250, thereby executing an application, and control various hardware. For example, the processor 240 may execute an application supporting a photographing function stored in the memory 250. Also, the processor 240 may execute an application(s) for controlling the first camera module 130 and/or the second camera module 140, and set up and support an appropriate photographing mode wherein the first camera module 130 and/or the second camera module 140 may perform an operation intended by a user.

In an embodiment, the memory 250 may store instructions executable by the processor 240. The memory 250 may include, for example, a component in which data is temporarily stored such as a random access memory (RAM) and/or a component in which data is permanently stored such as a solid state drive (SSD). For example, the processor 240 may implement a software module in a RAM space by calling instructions stored in the SSD. In various embodiments, the memory 250 may include various types, and may adopt an appropriate type according to the purpose of the device.

In an embodiment, one or more applications associated with the first camera module 130 and the second camera module 140 may be stored in the memory 250. For example, a camera application may be stored in the memory 250. The camera application may support various shooting functions, such as photo shooting, video shooting, panoramic shooting, and/or slow motion shooting.

In an embodiment, the applications associated with the first camera module 130 and the second camera module 140 may correspond to various types of applications. For example, a chat application, a web browser application, an email application, a shopping application, etc. may also use the first camera module 130 and/or the second camera module 140 in order to support a video call, photo/video attachment, streaming service, product image or product-related virtual reality (VR) shooting function.

In an embodiment, the first camera module 130 may include at least one of the first rear camera 132 of FIG. 1 and the second rear camera 134 of FIG. 1. Also, the second camera module 140 may include the front camera 141 of FIG. 1. The first camera module 130 may include a plurality of camera modules, and each camera module may include a lens set including a plurality of lenses. The camera module is described in detail with reference to FIG. 10, and a description of FIG. may be applied to both of the first camera module 130 and the second camera module 140.

In an embodiment, the first camera module 130 may include a plurality of camera modules, and among the plurality of camera modules, some camera modules may be sequentially activated. For example, when the first camera module 130 includes three rear cameras, a second rear camera may be activated together with a first rear camera, and the electronic device 100 may output a preview image acquired through the first rear camera, to the display 110. In an embodiment, when an input of controlling an optical/digital zoom function such as a zoom-in input is acquired from a user, the processor 240 may output a preview image acquired through the second rear camera (e.g., wide-capturing camera) 134 that is already in an activated state and has higher performance than the first rear camera 132, to the display 110. When the preview image acquired through the second rear camera 134 is outputted to the display 110, the processor 240 may prepare for an additional zoom-in input in advance, by deactivating the first rear camera 132 and activating a third rear camera. In an embodiment, when the preview image acquired through the second rear camera 134 is outputted to the display 110, the processor 240 may maintain a state of activating all of the first rear camera 132, the second rear camera 134, and the third rear camera. In this state, when a preview image acquired through the third rear camera (e.g., a telephoto camera) starts to be outputted to the display 110, the processor 240 may deactivate the first rear camera, and maintain the second rear camera and the third rear camera in an activation state. However, in further various embodiments, when a condition for simultaneously driving all rear camera modules such as supplying sufficient power to the electronic device 100 is satisfied, the electronic device 100 may always maintain all of a first rear camera module, a second rear camera module, and a third rear camera module in an activation state.

In an embodiment, the second camera module 140 may include one or more camera modules. When the second camera module 140 includes two or more cameras, a description of the activation algorithm described above in relation to the first camera module 130 may also be applied to the first camera module 130.

In an embodiment, the image sensor 220 may include a complementary metal oxide semiconductor (CMOS) sensor or a charged coupled device (CCD) sensor, etc. Light information of a subject incident through the lens assembly 210 may be converted into an electrical signal by the image sensor 220 and be inputted to the image signal processor 230. An infrared cut filter (hereinafter, IR cut filter) may be arranged on an upper surface of the image sensor 220, and an image of a subject passing through a lens may be partially filtered by the IR cut filter and then be detected by the image sensor 220.

In an embodiment, the image signal processor 230 (e.g., including image processing circuitry) may perform image processing on image data acquired from the image sensor 220. For example, the image signal processor 230 may perform at least one of 3A, that is, auto white balance (AWB), auto exposure (AE), auto focusing (AF) processing, lens shading correction, dead pixel correction, knee correction, noise control, tone curve adjustment, edge enhancement, and demosaicing.

In an embodiment, the image signal processor 230 may be operated separately from the processor 240, but in various embodiments the operation may be integrated.

Figure 3:
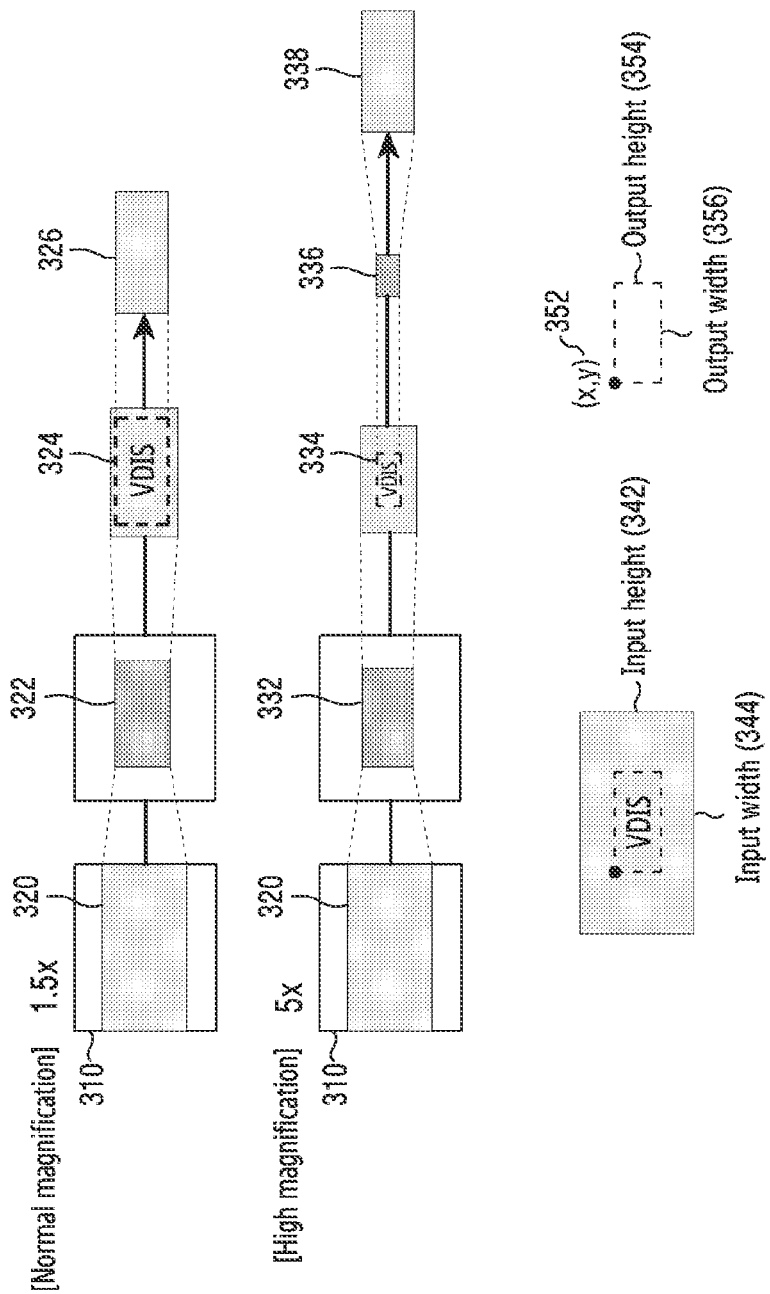
FIG. 3 illustrates a process of image stabilization in an example electronic device according to various embodiments.

FIG. 3 illustrates a process of image stabilization in an example electronic device according to various embodiments. Hereinafter, a description is provided based on an image for convenience's sake, but the corresponding description may be applied to a moving image or a frame included in the moving image.

Referring to FIG. 3, in an embodiment, the electronic device 100 may capture an image at a normal magnification. Normal magnification may refer, for example, to a magnification that does not cause a picture quality loss, even when zooming. While the image is captured at the normal magnification, the image sensor 220 may acquire image data 310 or 320. The image data 310 may refer, for example, to image data of all pixels acquired through the image sensor 220 of the first camera module 130, that is, a maximum resolution that the image sensor 220 may support, and the image data 320 may refer, for example, to image data corresponding to a predetermined multiple of a resolution of the display 110 of the electronic device 100 within a resolution range supported by the image sensor 220 or a resolution of a photographing mode (e.g., 16:9, 1:1 mode, FHD, 4 k mode, etc.) supported by a photographing application. Hereinafter, for convenience of description, the term image data is used without being separately distinguished, unless otherwise noted.

In an embodiment, the processor 240 may acquire image data 322 corresponding to a normal magnification (e.g., 1.5 times) from among the image data acquired through the image sensor 220. The size of the image data 322 corresponding to the normal magnification may be determined by, for example, a resolution of the photographing mode and/or a stabilization range required (or preset) in order for the image stabilization unit to perform stabilization.

In the present disclosure, the image stabilization unit may refer, for example, to a hardware module and/or a software module included in the electronic device 100 in order to perform image stabilization. When the image stabilization unit is a hardware module, the image stabilization unit may correspond to some portion of the processor 240, or may be a separate component electrically connected to the processor 240. When the image stabilization unit is a software module, the image stabilization unit may correspond, for example, to a processing engine implemented by the processor 240 by executing instructions stored in the memory 250.

In an embodiment, the processor 240 may acquire output image data 324 obtained by applying image stabilization to at least a portion of the input image data 322 inputted to the image stabilization unit (e.g., VDIS unit). For example, the processor 240 may stabilize the image data 324 within a specified stabilization range (e.g., 20% horizontally and 20% vertically). The processor 240 may display a preview image 326 on the display 110, based on the outputted image data 324.

Referring to FIG. 3, in an embodiment, the electronic device 100 may capture an image at a high magnification. The high magnification mentioned in the present disclosure may refer, for example and without limitation, to a magnification (e.g., 5 times) at which a resolution loss occurs at zooming. When the image is captured at the high magnification, the image sensor 220 may acquire image data 310 or 320. The processor 240 may acquire image data 332 of a size that is determined as a portion of the acquired image data through the image sensor 220. The image data 332 may be determined based on a resolution of an image sensor and a resolution of a photographing mode. The processor 240 may present the image data 332 to the image stabilization unit (e.g., VDIS unit), and may control the image stabilization unit to stabilize the output image data 334 within a predetermined range. The processor 240 may upscale the stabilized image data 336 and display on the display as a preview image 338.

In an embodiment, the stabilization range may correspond, for example, to a difference between a size of an image corresponding to a VDIS input and a size of an image corresponding to a VDIS output. The stabilization range of the image data may be determined based on a difference between an input width 344 and an output width 356 and a difference between an input height 342 and an output height 354.

In an embodiment, the processor 240 may acquire start coordinates (x, y) 352 of a VDIS output image. In response to a user input, the processor 240 may acquire image data having a size greater than a size that is based on an acquired first magnification, not image data having the size that is based on the acquired first magnification. The processor 240 may forward the image data of the greater size to the image stabilization unit (e.g., VDIS unit). Accordingly, the processor 240 may acquire the start coordinates 352 of the VDIS output image from the image stabilization unit for the sake of image processing. In response to or based on acquiring the start coordinates 352, the processor 240 may perform image processing of a region in a preview image. For example, due to a subject moving outside the preview image, a stabilization region excluding a region of the preview image may be determined as a region of interest (ROI), and various image processing may be affected by the ROI. Accordingly, the processor 240 may acquire the start coordinates 352 of the VDIS output image in order to prevent image processing from being incomplete such as not being focused in the preview image that the user looks at due to the subject moving outside the region of the preview image.

The image processing may include auto focus, auto white balance, auto exposure, etc. The processor 240 may store the acquired start coordinates 352, the output height 354, and the output width 356 in a buffer, and may display a preview image, based on this information.

In an embodiment, the processor 240 may determine a size having no resolution loss when cropping is performed during a zoom operation using a resolution of the image sensor 220. For example, a size of 16:9 of an image sensor having a resolution of 4032×3024 may be 4032×2268. When a preview image outputted to the display 110 has 1920× 1080, which is a resolution of 16:9 FHD, and a stabilization range of each of a width and a height is set to 20%, a size of input image data (e.g., VDIS input) inputted to the image stabilization unit may be 2304×1296. Therefore, there is no loss of a picture quality at a range of 4032×3024, which is a resolution of 16:9 of the image sensor, to 2304×1296, even though an image is cropped by a zoom operation. The zoom magnification having no loss of resolution may be 1.75 times (4032/2304 times). The processor 240 may perform operation 430 of FIG. 4 below, in response to acquiring a higher magnification than a magnification having no resolution loss.

Figure 4:
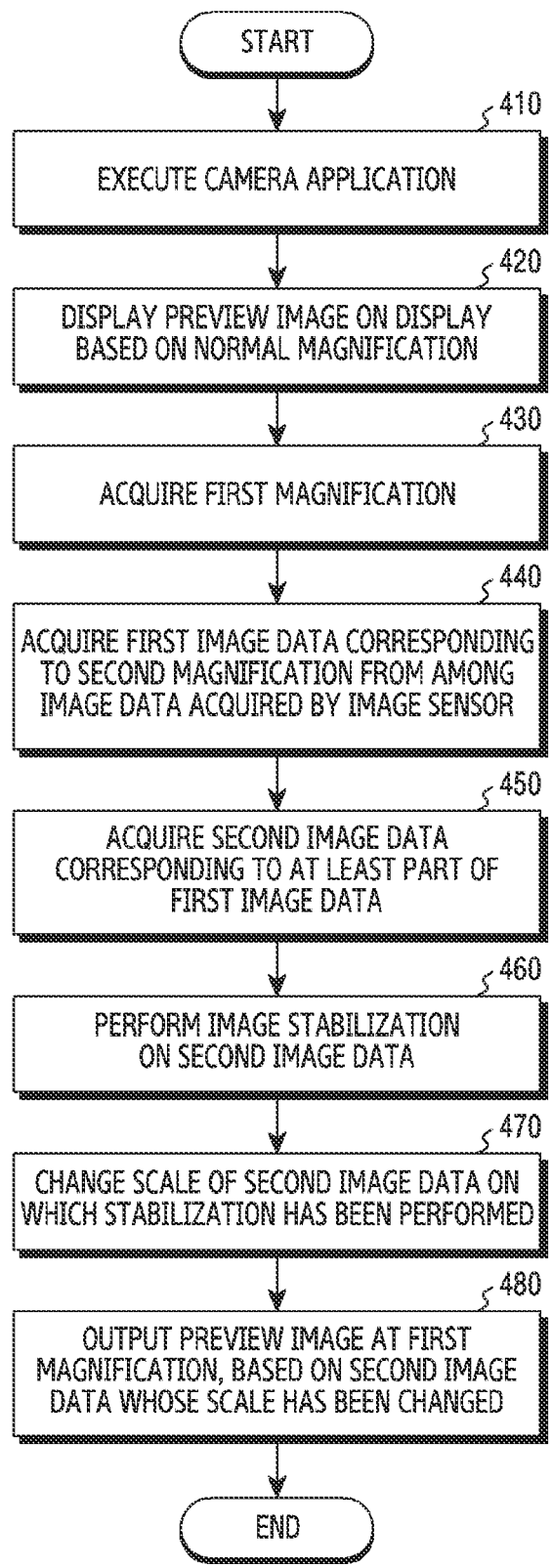
FIG. 4 is a flowchart illustrating image stabilization when an example electronic device acquires a zoom input corresponding to a high magnification according to various embodiments.

FIG. 4 is a flowchart illustrating image stabilization when an example electronic device acquires a zoom input corresponding to a high magnification according to various embodiments.

Referring to operation 410 of an embodiment, the processor 240 may execute a camera application. For example, the processor 240 may acquire a user input of executing the camera application. The user input may include at least one of touching an icon of the camera application, clicking the first function key 151 or the second function key 152, and inputting a voice such as "OOO, please turn on the camera" or "OOO, please run the camera", etc. through AI voice recognition. In response to at least one of these example user inputs, the processor 240 may execute the camera application.

Referring to operation 420 of an embodiment, the processor 240 may display a preview image on the display 110, based on a basic ("normal") magnification (e.g., 1 time). For example, when the camera application is executed, the processor 240 may display the preview image on at least a portion of the display 110, based on the basic magnification.

Referring to operation 430 of an embodiment, the processor 240 may acquire a first magnification. In response to a user input, the processor 240 may acquire the first magnification. The processor 240 may acquire the first magnification, in response to a user drag input of widening or reducing a distance between fingers using a finger(s) on at least a portion of the display on which the preview image is displayed. The processor 240 may acquire the first magnification in response to a user input of selecting an icon of a function capable of adjusting a magnification, which is one function of the camera application. The processor 240 may acquire the first magnification in response to a user's voice input such as "OOO, zoom 5×", "OOO, increase the magnification to 5×OOO", "show as large as possible", etc. through AI voice recognition.

Referring to operation 440 of an embodiment, the processor 240 may acquire first image data corresponding to a second magnification from among image data acquired by the image sensor 220. The processor 240 may acquire the first image data by cropping some of the image data acquired by the image sensor 220. The second magnification may be determined based on a resolution of the image sensor and a resolution of a photographing mode. Or, the second magnification may be determined based on the resolution of the image sensor and a resolution of the preview image. In response to acquiring a normal magnification, the processor 240 may determine the second magnification, based on at least one of the resolution of the image sensor, the resolution of the photographing mode, or a magnification inputted by a user. The resolution of the preview image may be the same as or be different from a resolution of an output mode. The second magnification may refer, for example, to a maximum magnification that does not cause a picture quality loss, or to a magnification that is less than or is equal to the maximum magnification.

Referring to operation 450 of an embodiment, the processor 240 may determine second image data corresponding to at least a portion of the first image data. The second image data may be image data that is a stabilization target of an image stabilization unit (e.g., a video digital image stabilization (VDIS) unit).

Referring to operation 460 of an embodiment, the processor 240 may perform image stabilization on the second image data. The processor 240 may perform the image stabilization on the second image data within a range of the first image data.

However, in various embodiments, there may be switching between a front camera and a rear camera. The front camera may be a camera for self-photography, and the rear camera may be a camera for photographing a subject. The rear camera may present a zoom function, and the front camera may not present the zoom function. When switching is made from the rear camera to the front camera, the processor 240 may initialize, wherein the second magnification value, the first image data, and the second image data stored in the memory 250 or the buffer are not applied to the front camera.

In an embodiment, there may be switching between a camera (e.g., the second rear camera) for wide shooting and a camera (e.g., the third rear camera) for telephoto shooting. Since the specifications of the camera for wide shooting and the camera for telephoto shooting are different, the second magnification value with no picture quality loss may be different. When there is switching in a high magnification condition, the processor 240 may perform image stabilization by changing the second magnification value and the stabilization range according to each camera.

Referring to operation 470 of an embodiment, the processor 240 may change a scale of the stabilized second image data. The scale of the stabilized second image data may be changed to correspond to a scale of a preview or a scale of an image frame stored in a memory. A preview image may be an image in which image-processed data is displayed on a display in real time. The image frames stored in the memory may be stored in a plurality of buffers. When the image frames are stored in the plurality of buffers, the processor 240 may perform image processing including image stabilization before the stored image frames are displayed on the display.

Referring to operation 480 of an embodiment, the processor 240 may output the preview image, based on the scale-changed second image data. The processor 240 may display an image to which the first magnification is applied, on the display, based on the scale-changed second image data. The processor 240 may apply the first magnification to an image to which a magnification has not been inputted, and display on the display.

In an embodiment, the processor 240 may display the second image data stored in the memory 250 or the buffer, as the preview image, through the display. When outputting the scale-changed second image data as the preview, the processor 240 may display on the display through image synthesis with other images. The image synthesis may refer, for example, to image synthesis based on data stored in the memory 250 or buffer at recording.

Figure 5:
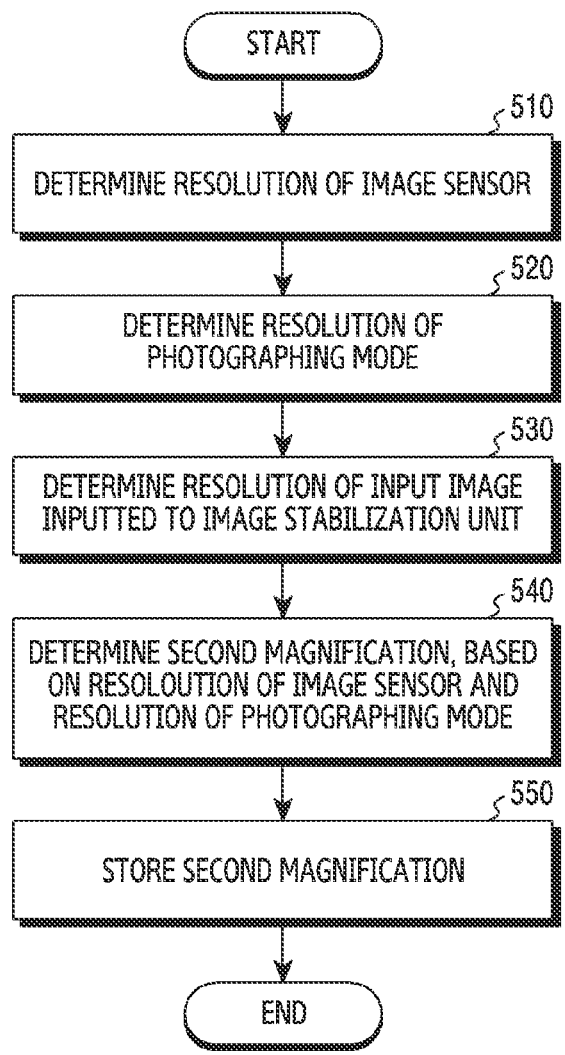
FIG. 5 is a flowchart of determining a magnification with no resolution loss in a process of photographing using an example electronic device according to various embodiments.

FIG. 5 is a flowchart of determining a magnification with no resolution loss in a process of photographing using an example electronic device according to various embodiments.

Referring to operation 510 of an embodiment, the processor 240 may determine a resolution of the image sensor 220. The resolution of the image sensor 220 may be different for each camera module. For example, a resolution supported by a front camera may be lower than a resolution supported by a rear camera. For another example, a resolution supported by a wide-angle camera may be different from a resolution supported by a telephoto camera.

Referring to operation 520 of an embodiment, the processor 240 may determine a resolution of a photographing mode. The processor 240 may determine the resolution of the set photographing mode. In response to a user input, the processor 240 may change the photographing mode, and may change a size of a preview image, based on a resolution corresponding to each photographing mode.

In an embodiment, a camera application may present a resolution function by dividing into high-resolution and low-resolution modes, or may present a resolution function by dividing into high-resolution, normal-resolution, and low-resolution modes.

In an embodiment, the resolution of the photographing mode may correspond to at least one of various resolutions and aspect ratios such as, but not limited to, 1440×1440 (1:1), 2280×1080, 1280×720 (16:9), 1920×1080 (16:9), 3840×2160 (16:9), etc.

Referring to operation 530 of an embodiment, the processor 240 may determine a resolution of an input image inputted to an image stabilization unit. The processor 240 may determine the resolution of the input image inputted to the image stabilization unit, based on the resolution of the photographing mode and an image stabilization range. For example, when the resolution of the photographing mode is A*B and stabilization ranges of a width and a height are each 20%, the resolution of the input image may be (A*1.2) *(B*1.2). The stabilization range may have the same value applied to a width and height of an image, but may be set differently.

Referring to operation 540 of an embodiment, the processor 240 may determine a second magnification, based on the resolution of the image sensor 220 and the resolution of the photographing mode. The processor 240 may determine a magnification that is not to be affected by a picture quality, based on resolution information of the image sensor 220 and resolution information of a current photographing mode.

Referring to operation 550 of an embodiment, the processor 240 may store data about the second magnification. The processor 240 may control the memory 250 or a buffer to store the data about the second magnification. The data about the second magnification may include a second magnification value and/or data corresponding to various settings and parameters used when the second magnification is acquired. Since the second magnification varies depending on the resolution of the input image presented to the image stabilization unit and the resolution of the image sensor, the processor 240 may store the data about the second magnification suitable for each situation.

Figure 6:
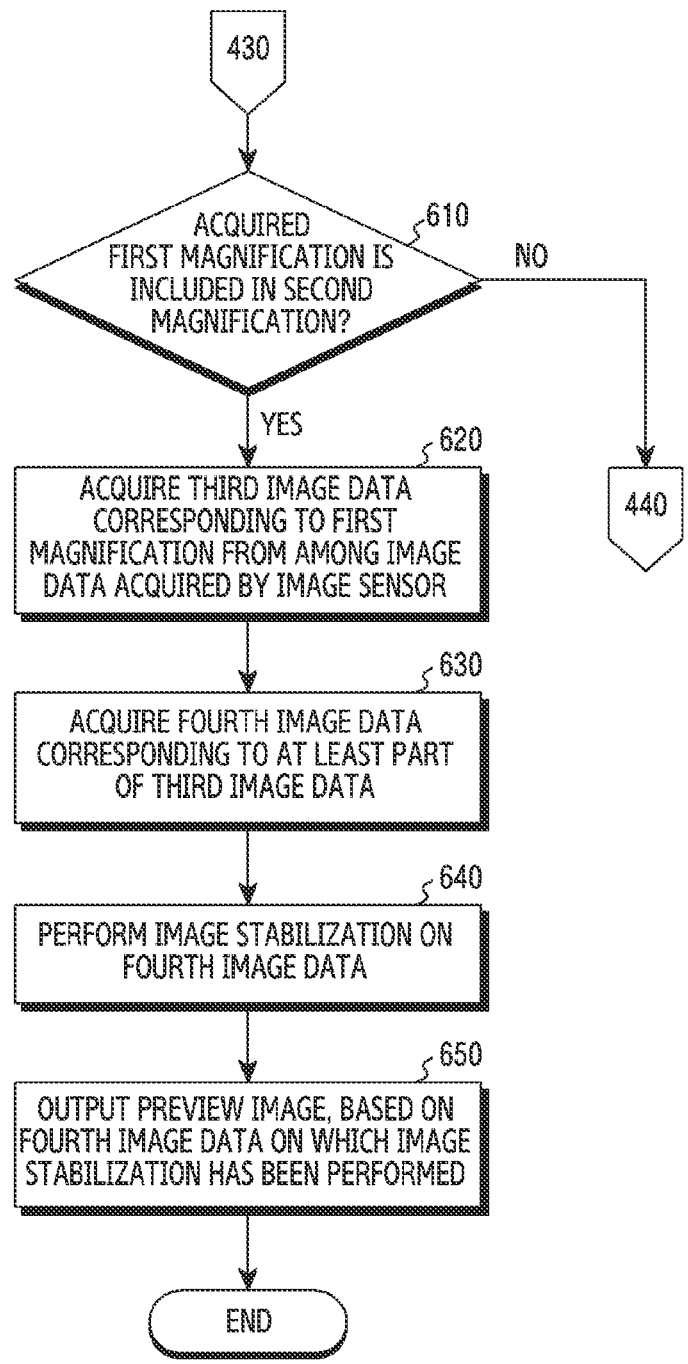
FIG. 6 is a flowchart illustrating image stabilization based on a magnification applied to an example electronic device according to various embodiments.

FIG. 6 is a flowchart illustrating image stabilization, based on a magnification applied to an example electronic device according to various embodiments. After operation 430 of FIG. 4, operation 610 may be performed.

Referring to operation 610 of an embodiment, the processor 240 may determine whether the acquired first magnification is included in a second magnification. The processor 240 may, for example, access the second magnification stored in the memory 250 in operation 550 of FIG. 5. When the first magnification is included in the second magnification by comparing the second magnification with the first magnification, operation 620 may be performed. When the first magnification exceeds the second magnification, operation 440 may be performed. For example, when the second magnification is 2 times and the first magnification is 1.5 times, the processor 240 may perform operation 620 at a normal magnification.

Referring to operation 620 of an embodiment, the processor 240 may crop a portion of image data acquired by the image sensor 220. The processor 240 may acquire third image data corresponding to the first magnification from among the acquired image data.

Referring to operation 630 of an embodiment, the processor 240 may acquire fourth image data, based on at least a portion of the third image data. The fourth image data may correspond to image data which is a stabilization target of the image stabilization unit (e.g., VDIS unit). For example, when a resolution of the third image data is 2304×1296, the fourth image data having a resolution of 1920×1080 corresponding to at least a part of the third image data may be acquired. That is, in the embodiment of FIG. 6, since the first magnification corresponds to a range in which a picture quality is not damaged, an up-scaling operation as in FIG. 4 may be omitted, and a resolution of the fourth image data which is an image stabilization target may be set to be the same as a resolution of a photographing mode.

Referring to operation 640 of an embodiment, the processor 240 may perform image stabilization on the fourth image data. For example, the processor 240 may perform image stabilization within a range of 2304×1296 on the fourth image data having the resolution of 1920×1080.

Referring to operation 650 of an embodiment, the processor 240 may output a preview image, based on the fourth image data on which the image stabilization has been performed. The processor 240 may apply the first magnification to an image to which a magnification has not been inputted, and display on the display.

Figure 7:
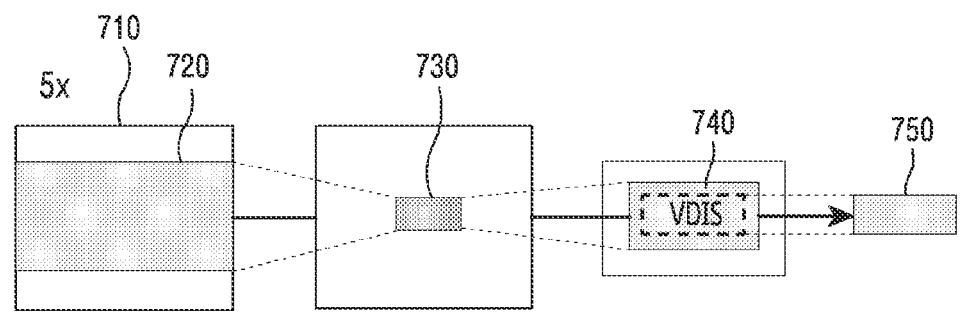
FIG. 7 illustrates a process of image stabilization at a high magnification in an example electronic device according to various embodiments.

FIG. 7 is a diagram illustrating a process of image stabilization at a high magnification in an example electronic device according to various embodiments.

For example, a resolution of an image sensor may be 4032×3024, and a resolution of a photographing mode may be 1920×1080 in FHD. The processor 240 may crop, at 3:2 or 16:9, image data acquired by the image sensor 220. When the acquired image data is cropped at 3:2, a size of an input image presented to an image stabilization unit (e.g., a VDIS unit) may be longer than that of when the image data is cropped at 16:9. Since an output image outputted from the image stabilization unit (e.g., VDIS unit) is the same in the case of 3:2 cropping and 16:9 cropping, it is possible to further secure a stabilization range.

Referring to FIG. 7, in an embodiment, the electronic device 100 may capture an image at a high magnification. When the image is captured at the high magnification, the image sensor 220 may acquire image data 710. The processor 240 may acquire image data 720, which is a part of the acquired image data, through the image sensor 220. The processor 240 may acquire input image data 730, based on the image data 720. The processor 240 may acquire the input image data 730 by resizing the image data 720. The processor 240 may change a scale of the image data 730 in order to present the image data 730 to the image stabilization unit (e.g., VDIS unit). The processor 240 may acquire the scale-changed image data through the image stabilization unit (e.g., VDIS unit). The processor 240 may acquire output image data 740 that is at least a portion of the input image data 730 inputted to the image stabilization unit (e.g., VDIS unit). The processor 240 may stabilize the image data 740 within a specified stabilization range.

In an embodiment, a horizontal to vertical ratio of the image data 720 may be different from a horizontal to vertical ratio of an image 750. In an embodiment, a horizontal to vertical ratio of the input image data 730 presented to the VDIS may be different from a horizontal to vertical ratio of the preview image data 740. The processor 240 may acquire the VDIS input image data 730, based on the image data 720 of the ratio smaller than a horizontal to vertical ratio of a resolution of the image 750. In this case, since a ratio more increasing a height value than 16:9 may be used for the input image data inputted to the image stabilization unit (e.g., VDIS unit), a stabilization range may be further increased. For example, when a resolution of a photographing mode is 1920×1080 and a ratio of the image data 720 is 16:9, the VDIS input image data may be 2304×1296. When the resolution of the photographing mode is 1920×1080 and the ratio of the image data 720 is 3:2, the VDIS input image data may be 2304×1536.

Figure 8:
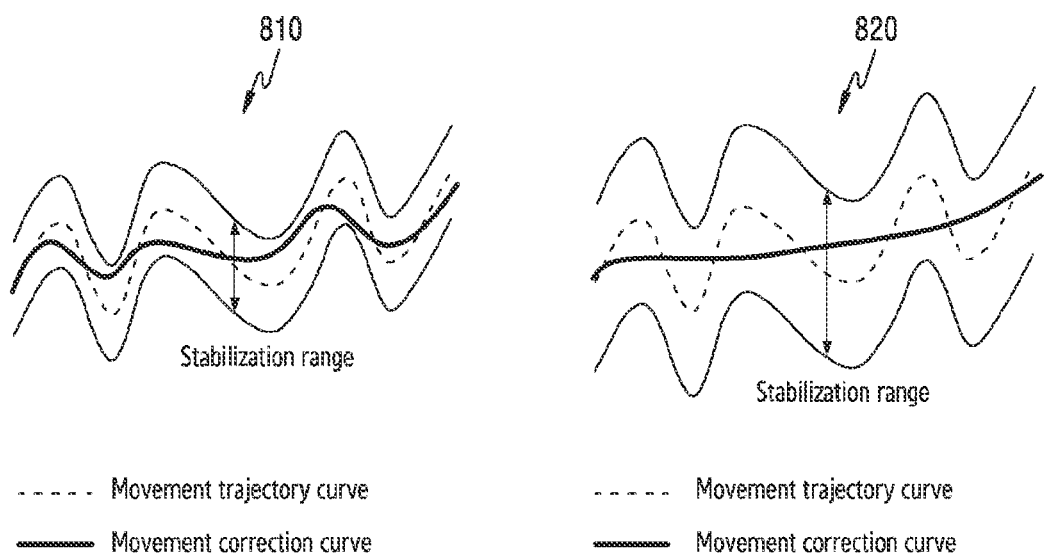
FIG. 8 illustrates example effects achieved by an example electronic device according to various embodiments.

FIG. 8 illustrates the effects of the systems and methods of present disclosure according to various embodiments.

Referring to FIG. 8, the effect 810 of conventional technology and the effect 820 of the systems and methods of the present disclosure are shown through a movement trajectory curve and a movement correction curve, respectively.

In an embodiment, the movement trajectory curve may refer, for example, to a path on which a subject moves. The movement trajectory curve may refer, for example, to a path that, when an object or person to be photographed is fixed, the subject moves on a preview image due to a camera shake.

In an embodiment, the movement correction curve may be a curve acquired by correcting the movement trajectory curve caused by camera shake. When the movement trajectory curve is a curve of a form vibrating in various directions such as up, down, left, right, and others, the subject may be seen as shaking on the preview image.

Looking at the effect 810 of the conventional technology, even if the camera shake is corrected, the shake of the subject may still be detected on the preview image. The processor 240 may capture a movement in a main direction of the subject on the preview image, but may also capture an unwanted shake.

Looking at the effect 820 of the systems and methods of the present disclosure, when the camera shake is corrected, the shake of the subject on the preview image may be minimized or reduced. When the shake is minimized or reduced, the movement in the main direction of the subject may be captured, excluding an unwanted shake.

Referring to FIG. 8, it may be seen that the effect of the systems and methods of the present disclosure is improved or superior to that of the conventional technology, in high magnification shooting. The larger a stabilization range, the more effectively the shake of the subject on the preview image caused by the camera shake may be corrected, and it may be seen that a linear component of the movement correction curve is enhanced.

Figure 9:
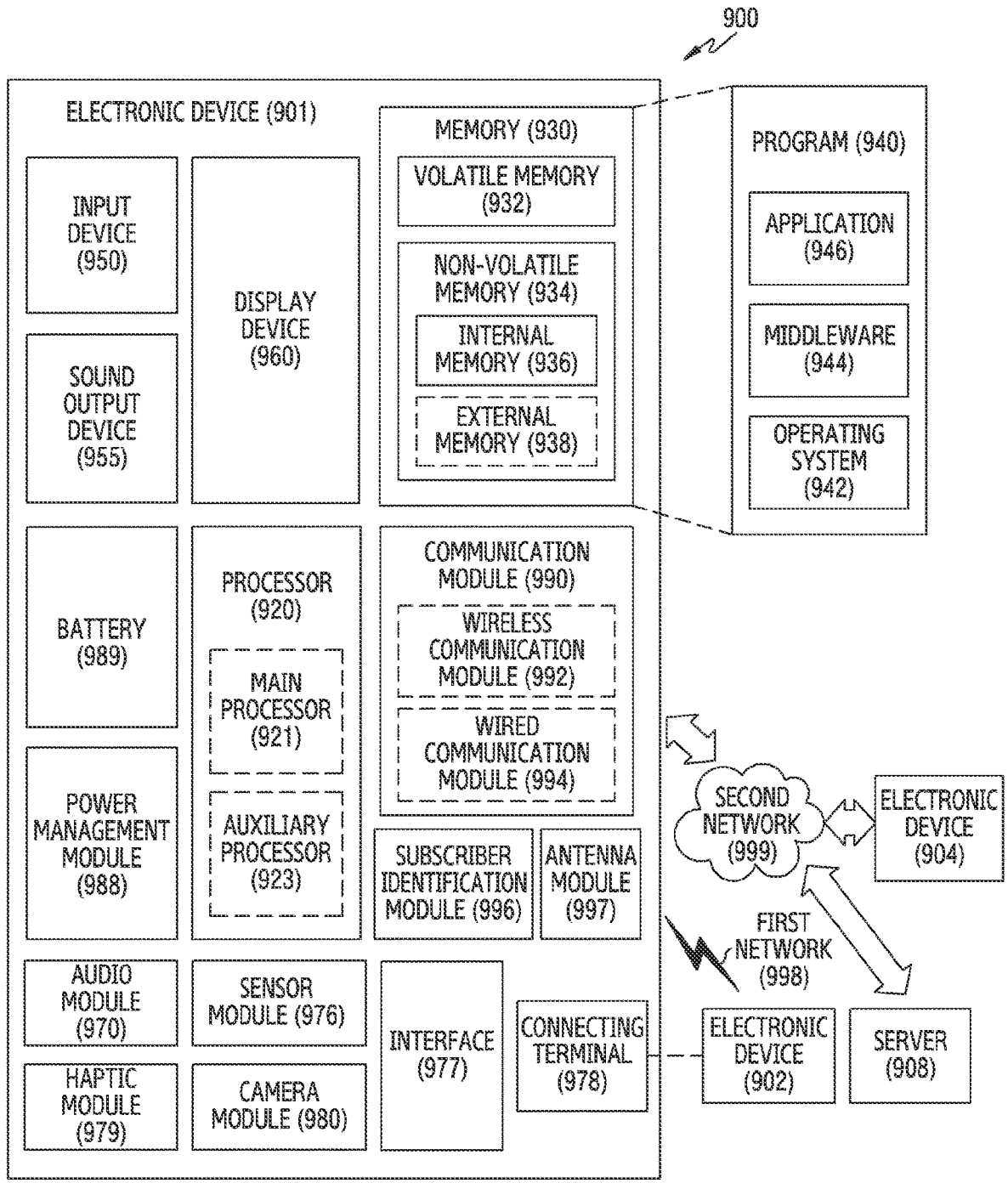
FIG. 9 is a block diagram of an example electronic device in a network environment according to various embodiments.

FIG. 9 is a block diagram of an example electronic device in a network environment according to various embodiments. Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In various embodiments, at least one (e.g., the display device 960 or the camera module 980) of the components may be omitted from the electronic device 901, or one or more other components may be added in the electronic device 901. In various embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to an embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by another component (e.g., the processor 920) of the electronic device 901, from the outside (e.g., a user) of the electronic device 901. The input device 950 may include, for example, a microphone, a mouse, a keyboard, or a digital pen (e.g., a stylus pen).

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

The connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to an embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include an antenna including a radiating element composed of or including a conductive material or a conductive pattern formed in or on a substrate (e.g., PCB). According to an embodiment, the antenna module 997 may include a plurality of antennas. In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" storage medium may, for example, refer to a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 10:
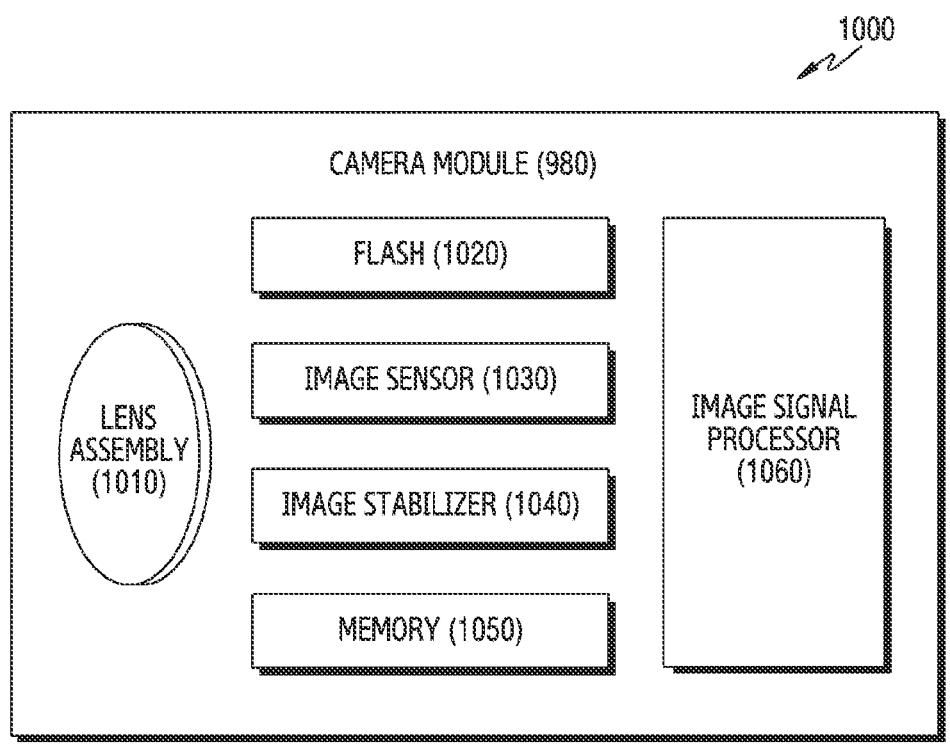
FIG. 10 is a block diagram illustrating an example camera module according to various embodiments.

FIG. 10 is a block diagram illustrating an example camera module according to various embodiments. Referring to FIG. 10, the camera module 980 may include a lens assembly 1010, a flash 1020, an image sensor 1030, an image stabilizer 1040, memory 1050 (e.g., buffer memory), or an image signal processor 1060. The lens assembly 1010 may collect light emitted or reflected from an object whose image is to be taken. The lens assembly 1010 may include one or more lenses. According to an embodiment, the camera module 980 may include a plurality of lens assemblies 1010. In such a case, the camera module 980 may form, for example, a dual camera, a 360-degree camera, or a spherical camera. Some of the plurality of lens assemblies 1010 may have the same lens attribute (e.g., view angle, focal length, auto-focusing, f number, or optical zoom), or at least one lens assembly may have one or more lens attributes different from those of another lens assembly. The lens assembly 1010 may include, for example, a wide-angle lens or a telephoto lens.

The flash 1020 may emit light that is used to reinforce (supplement) light reflected from an object. According to an embodiment, the flash 1020 may include one or more light emitting diodes (LEDs) (e.g., a red-green-blue (RGB) LED, a white LED, an infrared (IR) LED, or an ultraviolet (UV) LED) or a xenon lamp. The image sensor 1030 may obtain an image corresponding to an object by converting light emitted or reflected from the object and transmitted via the lens assembly 1010 into an electrical signal. According to an embodiment, the image sensor 1030 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1030 may be implemented using, for example, a charged coupled device (CCD) sensor or a complementary metal oxide semiconductor (CMOS) sensor.

The image stabilizer 1040 may move the image sensor 1030 or at least one lens included in the lens assembly 1010 in a particular direction, or control an operational attribute (e.g., adjust the read-out timing) of the image sensor 1030 in response to the movement of the camera module 980 or the electronic device 901 including the camera module 980. This allows compensating for at least part of a negative effect (e.g., image blurring) by the movement on an image being captured. According to an embodiment, the image stabilizer 1040 may sense such a movement by the camera module 980 or the electronic device 901 using a gyro sensor (not shown) or an acceleration sensor (not shown) disposed inside or outside the camera module 980. According to an embodiment, the image stabilizer 1040 may be implemented, for example, as an optical image stabilizer. The memory 1050 may store, at least temporarily, at least part of an image obtained via the image sensor 1030 for a subsequent image processing task. For example, if image capturing is delayed due to shutter lag or multiple images are quickly captured, a raw image obtained (e.g., a Bayer-patterned image, a high-resolution image) may be stored in the memory 1050, and its corresponding copy image (e.g., a low-resolution image) may be previewed via the display device 960. Thereafter, if a specified condition is met (e.g., by a user's input or system command), at least part of the raw image stored in the memory 1050 may be obtained and processed, for example, by the image signal processor 1060. According to an embodiment, the memory 1050 may be configured as at least part of the memory 930 or as a separate memory that is operated independently from the memory 930.

The image signal processor 1060 may perform one or more image processes with respect to an image obtained via the image sensor 1030 or an image stored in the memory 1050. The one or more image processes may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1060 may perform control (e.g., exposure time control or read-out timing control) with respect to at least one (e.g., the image sensor 1030) of the components included in the camera module 980. An image processed by the image signal processor 1060 may be stored back in the memory 1050 for further processing, or may be provided to an external component (e.g., the memory 930, the display device 960, the electronic device 902, the electronic device 904, or the server 908) outside the camera module 980. According to an embodiment, the image signal processor 1060 may be configured as at least part of the processor 920, or as a separate processor that is operated independently from the processor 920. If the image signal processor 1060 is configured as a separate processor from the processor 920, at least one image processed by the image signal processor 1060 may be displayed, by the processor 920, via the display device 960 as it is or after being further processed.

According to an embodiment, the electronic device 901 may include a plurality of camera modules 980 having different attributes or functions. In such a case, at least one of the plurality of camera modules 980 may form, for example, a wide-angle camera and at least another of the plurality of camera modules 980 may form a telephoto camera. Similarly, at least one of the plurality of camera modules 980 may form, for example, a front camera and at least another of the plurality of camera modules 980 may form a rear camera.

In the specific embodiments of the present disclosure described above, components included in the disclosure are expressed in the singular or plural according to the specific embodiments presented. However, the singular or plural expression is appropriately selected for a situation presented for description convenience's sake, and the present disclosure is not limited to the singular or plural component, and even the component expressed in the plural may be composed of the singular, or even the component expressed in the singular may be composed of the plural.

Meanwhile, although specific embodiments have been described in the detailed description of the present disclosure, various modifications are possible without departing from the scope of the present disclosure. Therefore, the scope of the present disclosure should not be limited to and defined by the described embodiments and should be defined by not only the claims described below but also equivalents to these claims.

What is claimed is:

1. An electronic device comprising:
   at least one camera module, the at least one camera module comprising a first camera module including an image sensor;
   a display; and
   at least one processor connected to the first camera module and the display,
   wherein the at least one processor is configured to:
   acquire a magnification input corresponding to a first magnification;
   based on acquiring the magnification input, acquire first image data corresponding to a second magnification different from the first magnification from among image data acquired by the image sensor of the first camera module;
   determine second image data corresponding to at least a part of the acquired first image data based on an image stabilization range;
   perform image stabilization on the second image data;
   change a scale of the image-stabilized second image data, based on the first magnification and the second magnification; and
   acquire preview image data for displaying on the display a preview image having the first magnification, based on the scale-changed, image-stabilized second image data,
   wherein the image stabilization range corresponds to a difference between a size of an image corresponding to the first image data and a size of the preview image.

2. The electronic device of claim 1, wherein the second magnification is determined based on at least one of a resolution of the image sensor, a resolution of a photographing mode, or a stabilization range of the image stabilization.

3. The electronic device of claim 1, wherein the stabilization range comprises a first range value corresponding to a first dimension of the preview image and a second range value corresponding to a second dimension of the preview image, the first and second values being different from each other.

4. The electronic device of claim 1, wherein the first magnification is higher than the second magnification.

5. The electronic device of claim 1, further comprising a second camera module, wherein the at least one processor is configured to, when changing from the first camera module to the second camera module, change the second magnification, based on a resolution of an image sensor comprised in the second camera module.

6. The electronic device of claim 1, wherein the at least one processor is configured to acquire a coordinate value of the second image data.

7. The electronic device of claim 1, wherein the at least one processor is configured to store a parameter corresponding to the second magnification in a memory.

8. The electronic device of claim 1, wherein the at least one processor is configured to, when the acquired first magnification is less than the second magnification:
   acquire third image data corresponding to the first magnification from among the image data acquired by the image sensor, and
   display a preview image having the first magnification on the display, based on the acquired third image data.

9. The electronic device of claim 8, wherein the at least one processor is configured to:
   perform image stabilization on fourth image data corresponding to a part of the third image data, and
   display a preview image having the first magnification on the display, based on the image-stabilized fourth image data.

10. A method of operating an electronic device, the method comprising:
    acquiring, by at least one processor of the electronic device, a magnification input corresponding to a first magnification;
    based on acquiring the magnification input, acquiring first image data corresponding to a second magnification different from the first magnification from among image data acquired by an image sensor of at least one camera module included in the electronic device;
    determining second image data corresponding to at least a part of the acquired first image data based on an image stabilization range;
    performing image stabilization on the second image data;
    changing a scale of the image-stabilized second image data, based on the first magnification and the second magnification; and
    acquiring preview image data for displaying a preview image having the first magnification on a display of the electronic device, based on the scaled-changed, image-stabilized second image data,
    wherein the image stabilization range corresponds to a difference between a size of an image corresponding to the first image data and a size of the preview image.

11. The method of claim 10, wherein the first magnification is higher than the second magnification.

12. The method of claim 10, further comprising storing a parameter corresponding to the second magnification in a memory of the electronic device.

13. The method of claim 10, further comprising:
    when the acquired first magnification is less than the second magnification, acquiring third image data corresponding to the first magnification from among the image data acquired by the image sensor; and displaying a preview image having the first magnification on the display, based on the acquired third image data.

14. A non-transitory computer-readable storage medium storing computer-readable instructions which, when executed by at least one processor of an electronic device, enable the at least one processor to control the electronic device to:

acquire a magnification input corresponding to a first magnification, based on acquiring the magnification input, acquire first image data corresponding to a second magnification different from the first magnification from among image data acquired by an image sensor of at least one camera module included in the electronic device, determine second image data corresponding to at least a part of the acquired first image data based on an image stabilization range, perform image stabilization on the second image data, change a scale of the image-stabilized second image data, based on the first magnification and the second magnification, and acquire preview image data for displaying a preview image having the first magnification on a display of the electronic device, based on the scale-changed, image-stabilized second image data, wherein the image stabilization range corresponds to a difference between a size of an image corresponding to the first image data and a size of the preview image.

15. The non-transitory computer-readable storage medium of claim 14, wherein the instructions, when executed, further enable the at least one processor to control the electronic device to:

execute a camera application stored in a memory of the electronic device.

16. The non-transitory computer-readable storage medium of claim 15, wherein the instructions, when executed, further enable the at least one processor to control the electronic device to:

display a preview image at a first resolution based on executing the camera application.

17. The non-transitory computer-readable storage medium of claim 16, wherein the instructions, when executed, further enable the at least one processor to control the electronic device to:

change the preview image from the first resolution to a second resolution based on a user input for changing a photographing mode.

18. The non-transitory computer-readable storage medium of claim 17, wherein the instructions, when executed, further enable the at least one processor to control the electronic device to:

change the second magnification based on the first resolution and the second resolution.

* * * * *